United States Patent
Takacs et al.

(10) Patent No.: US 10,731,639 B2
(45) Date of Patent: Aug. 4, 2020

(54) VARIABLE GEOMETRY FUEL SUMP PADS

(71) Applicant: LOCKHEED MARTIN CORPORATION, Bethesda, MD (US)

(72) Inventors: Robert S. Takacs, Oxford, CT (US); John S. Yerant, Milford, CT (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 112 days.

(21) Appl. No.: 16/030,352

(22) Filed: Jul. 9, 2018

(65) Prior Publication Data

US 2020/0011319 A1 Jan. 9, 2020

(51) Int. Cl.
*B64D 37/06* (2006.01)
*F04B 43/00* (2006.01)
*F04B 17/05* (2006.01)

(52) U.S. Cl.
CPC .......... *F04B 43/0081* (2013.01); *B64D 37/06* (2013.01); *F04B 17/05* (2013.01)

(58) Field of Classification Search
CPC ........ B64D 37/22; B64D 37/08; B64D 37/04; B64D 37/16; B64D 37/20; B64D 37/24; B64D 37/06; B64C 27/04; Y10T 137/3115
USPC ........................................................ 137/206
See application file for complete search history.

(56) References Cited

U.S. PATENT DOCUMENTS

| | | | | |
|---|---|---|---|---|
| 2,654,553 A * | 10/1953 | Cyril | .......................... | F02C 7/22 244/135 R |
| 3,053,488 A * | 9/1962 | Cox, Jr. | .................. | F41F 3/065 244/130 |
| 5,460,135 A * | 10/1995 | Ohashi | .................... | B60K 15/03 123/518 |
| 6,260,544 B1 | 7/2001 | Spry et al. | | |
| 8,002,142 B2 * | 8/2011 | Losinski | ................ | B64D 37/08 220/530 |
| 9,352,845 B1 * | 5/2016 | Albert | ..................... | B64D 37/06 |
| 9,597,859 B2 * | 3/2017 | Childress | .............. | B32B 25/042 |
| 9,623,980 B2 | 4/2017 | Meillat et al. | | |
| 10,353,068 B1 * | 7/2019 | Jinkins | .................... | G01S 13/94 |

FOREIGN PATENT DOCUMENTS

GB 794125 4/1958
GB 2544745 A 5/2017

* cited by examiner

*Primary Examiner* — Craig J Price
(74) *Attorney, Agent, or Firm* — Cantor Colburn LLP

(57) ABSTRACT

A fuel system for providing fuel to a downstream component includes a fuel tank container having a hollow interior for storing a volume of fuel and a fuel line fluidly coupling the hollow interior with the downstream component. A first end of the fuel line is arranged within the hollow interior such that a fuel pick-up location is defined between the first end of the fuel line and an adjacent surface of the fuel tank container. A sump pad is positioned within the hollow interior. The sump pad is transformable between a deflated configuration and an inflated configuration to direct fuel within the hollow interior toward the fuel pick-up location.

19 Claims, 5 Drawing Sheets

VARIABLE GEOMETRY FUEL SUMP PADS

BACKGROUND

Embodiments disclosed herein relate to a fuel system, and more specifically, to a fuel system including one or more adjustable sump pads for use in an aircraft.

Aircraft, such as airplanes, helicopters, turbo props and tilt rotor aircraft typically often include one or more containers for storage of fuel on board the aircraft. Each container provides a sealed volume for the storage of fuel and may vary from a discrete tank, such as having one or more bladders, to nothing more than a sealed chamber m the aircraft structure. The containers include fittings and/or connections for filling the container with fuel, outputting the fuel to an aircraft engine, and may also include ancillary components such as fuel pumps, fuel filters, vent fittings, and sump pads.

Typically, in an aircraft such as a helicopter, the containers are located within the fuselage or are mounted in a space external to the fuselage, such as within the sponsons or protrusions from the fuselage of the aircraft. The external location allows for easy access for installation and mounting of the fuel containers into the sponsons. In addition, the sponsons may provide extra fuel capacity or allow for more free space within the fuselage.

Due to the wide range of pitch angles or attitudes that a helicopter may experience in flight and the desire to minimize unusable fuel, sump pads are often positioned within the fuel tank to funnel fuel toward the fuel supply inlet. Inclusion of sump pads is intended to optimize the use of the fuel within the tank. However, sump pads are typically large and add weight to the aircraft while reducing the usable fuel volume of the fuel tank. In addition, when an adequate amount of fuel is within the tanks, the sump pads provide no benefit. Additionally, there is typically a significant amount of unusable fuel that the sump pads are unable to mitigate.

BRIEF DESCRIPTION

According to an embodiment, a fuel system for providing fuel to a downstream component includes a fuel tank container having a hollow interior for storing a volume of fuel and a fuel line fluidly coupling the hollow interior with the downstream component. A first end of the fuel line is arranged within the hollow interior such that a fuel pick-up location is defined between the first end of the fuel line and an adjacent surface of the fuel tank container. A sump pad is positioned within the hollow interior. The sump pad is transformable between a deflated configuration and an inflated configuration to direct fuel within the hollow interior toward the fuel pick-up location.

In addition to one or more of the features described above, or as an alternative, in further embodiments the sump pad is arranged in fluid communication with a source, the source being operable in a first mode and a second mode.

In addition to one or more of the features described above, or as an alternative, in further embodiments in the first mode, the source supplies a pressurized fluid to the sump pad to inflate the sump pad.

In addition to one or more of the features described above, or as an alternative, in further embodiments the source is an engine.

In addition to one or more of the features described above, or as an alternative, in further embodiments the source is an auxiliary power unit.

In addition to one or more of the features described above, or as an alternative, in further embodiments in the second mode, the source draws fluid from the sump pad and exhausts the fluid outside the fuel tank system.

In addition to one or more of the features described above, or as an alternative, in further embodiments the source is a vacuum.

In addition to one or more of the features described above, or as an alternative, in further embodiments the source is atmospheric pressure.

In addition to one or more of the features described above, or as an alternative, in further embodiments comprising a probe for measuring a volume of fuel within the hollow interior of the fuel tank container.

In addition to one or more of the features described above, or as an alternative, in further embodiments the source is operable in at least one of the first mode and the second mode in response to the volume of fuel measured by the probe.

In addition to one or more of the features described above, or as an alternative, in further embodiments the fuel tank container is a bladder.

In addition to one or more of the features described above, or as an alternative, in further embodiments the sump pad is a bladder.

In addition to one or more of the features described above, or as an alternative, in further embodiments the fuel system is part of an aircraft.

According to another embodiment, a method of operating a fuel system includes detecting a volume of fuel within a hollow interior of a fuel tank container, performing a comparison of the detected volume with a pre-determined threshold, and transforming a configuration of a sump pad disposed within the hollow interior of the fuel tank container in response to the comparison.

In addition to one or more of the features described above, or as an alternative, in further embodiments transforming the configuration of the sump pad in response to the comparison includes supplying a pressurized fluid to the sump pad to at least partially inflate the sump pad.

In addition to one or more of the features described above, or as an alternative, in further embodiments supplying the pressurized fluid to the sump pad to at least partially inflate the sump pad occurs when the detected volume of fuel equal to or less than the predetermined threshold.

In addition to one or more of the features described above, or as an alternative, in further embodiments transforming the configuration of the sump pad in response to the comparison includes drawing a fluid from the sump pad to at least partially deflate the sump pad.

In addition to one or more of the features described above, or as an alternative, in further embodiments drawing the fluid from the sump pad to at least partially deflate the sump pad occurs when the detected volume of fuel is greater than the predetermined threshold.

In addition to one or more of the features described above, or as an alternative, in further embodiments detecting a volume of fuel within a hollow interior of a fuel tank container is performed by a probe disposed within the hollow interior of the fuel tank container.

In addition to one or more of the features described above, or as an alternative, in further embodiments comprising detecting an attitude of the fuel tank container.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
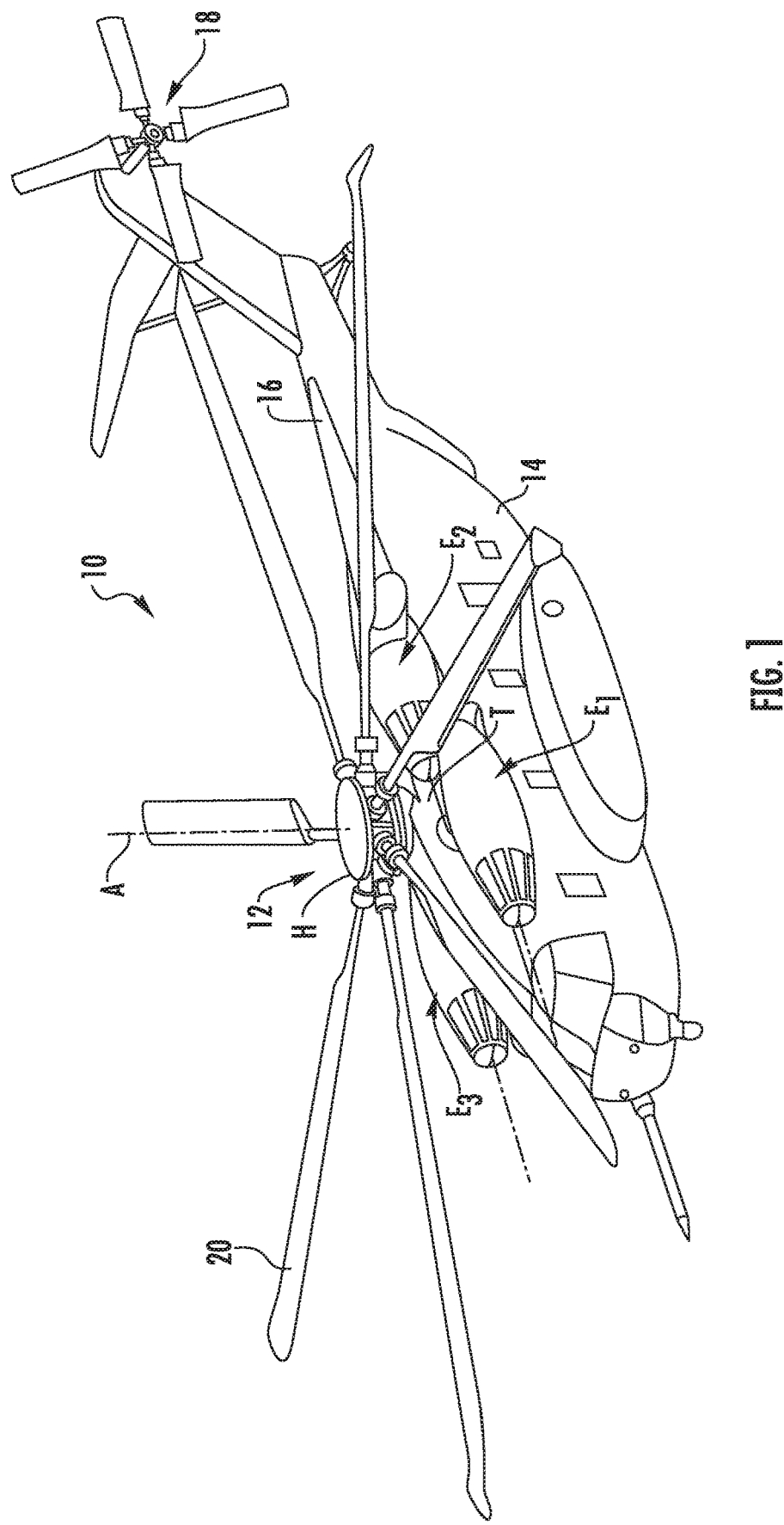
FIG. 1 is a perspective view of an example of an aircraft.

FIG. 1 schematically illustrates a rotary wing aircraft 10 having a main rotor assembly 12. The aircraft 10 includes an airframe 14 having an extended tail 16 which mounts a tail rotor system 18, such as an anti-torque system, a translational thrust system, a pusher propeller, a rotor propulsion system, and the like. The main rotor assembly 12 includes a plurality of rotor blade assemblies 20 mounted to a rotor hub H. The main rotor assembly 12 is driven about an axis of rotation A through a main gearbox (not shown) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the disclosure.

With reference now to FIGS. 2-5, an example of a fuel system 30 for use in a vehicle, such as aircraft 10 for example, is illustrated in more detail. As shown, the fuel system 30 includes a fuel tank 32 having a generally hollow interior 34. In an embodiment, the fuel tank 32 is formed from a flexible bladder or other container and is positioned within the fuselage 14, such as below a deck adjacent a keel or airframe beam 22 (see FIG. 4), or between aircraft beams. However, it should be understood that the fuel tank 32 arranged at any location relative to the vehicle is within the scope of the disclosure. A fuel line 36 extends through a wall 38 of the fuel tank container 32 into the interior 34. The fuel line 36 is configured to supply fuel from the interior 34 of the fuel tank 32 to a downstream component (not shown) of the fuel system 30, such as an engine for example. As shown, a first end 40 of the fuel line 36 may be positioned generally adjacent, but offset from an interior surface 42 of the fuel tank container 32 such that a fuel pick-up location, illustrated schematically at 44, is defined between the first end 40 of the fuel line 36 and the adjacent surface 42.

Figure 4:
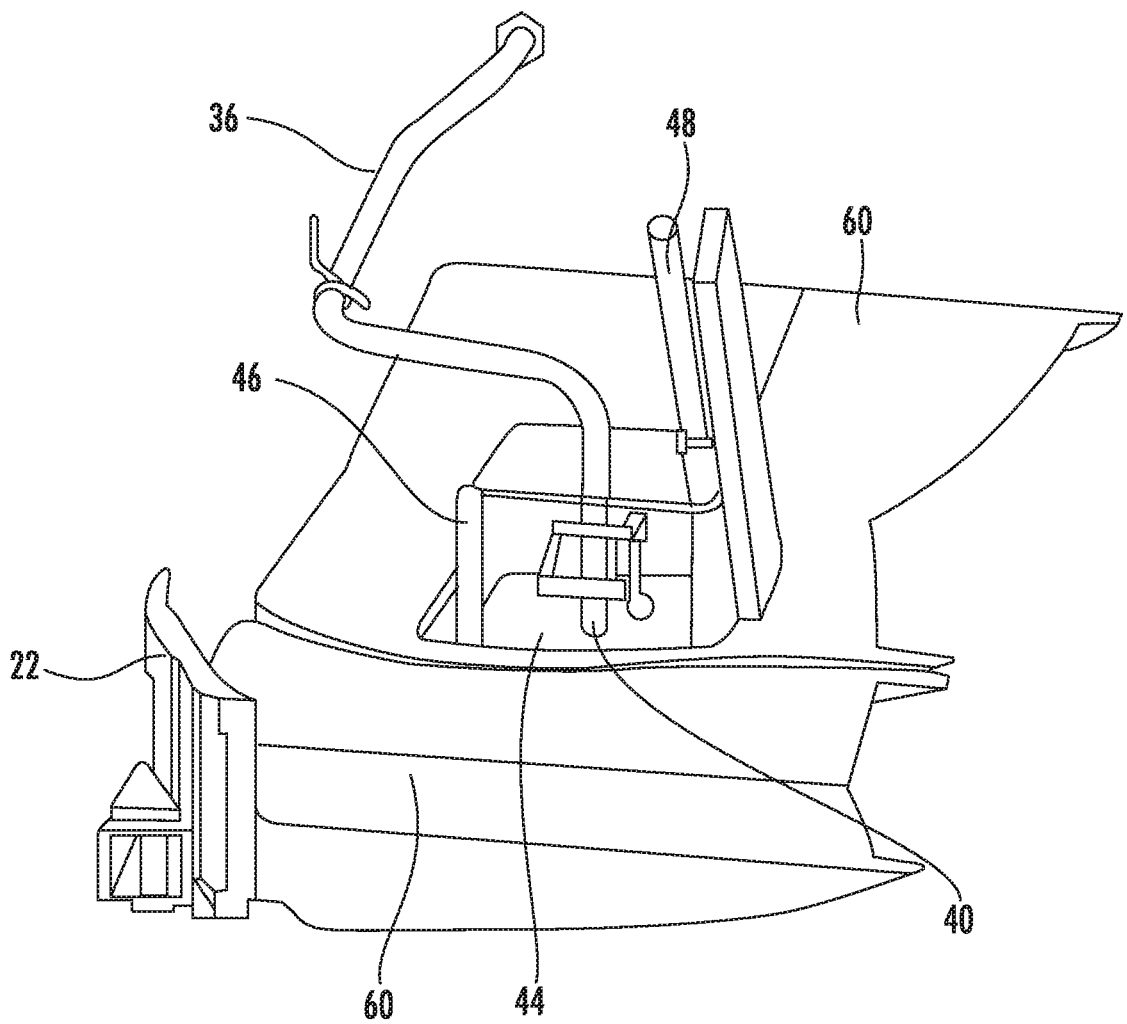
FIG. 4 is a perspective view of a part of a fuel tank system having a sump pad in a first configuration according to an embodiment.

In an embodiment, a maneuvering can 46, best shown in FIG. 4, is arranged within the interior 34 of the fuel tank 32 and may surround the fuel pick-up location 44 and a portion of the fuel line 36. The maneuvering can 46 may extend from the surface 42 of the tank 32, or alternatively, may be supported at a position offset from the surface 42. In embodiments where the maneuvering can 46 is in contact with the surface 42, the maneuvering can 46 may include one or more openings (not shown) to allow fuel to flow into the fuel pick-up location 44 in an unobstructed manner.

Figure 3:
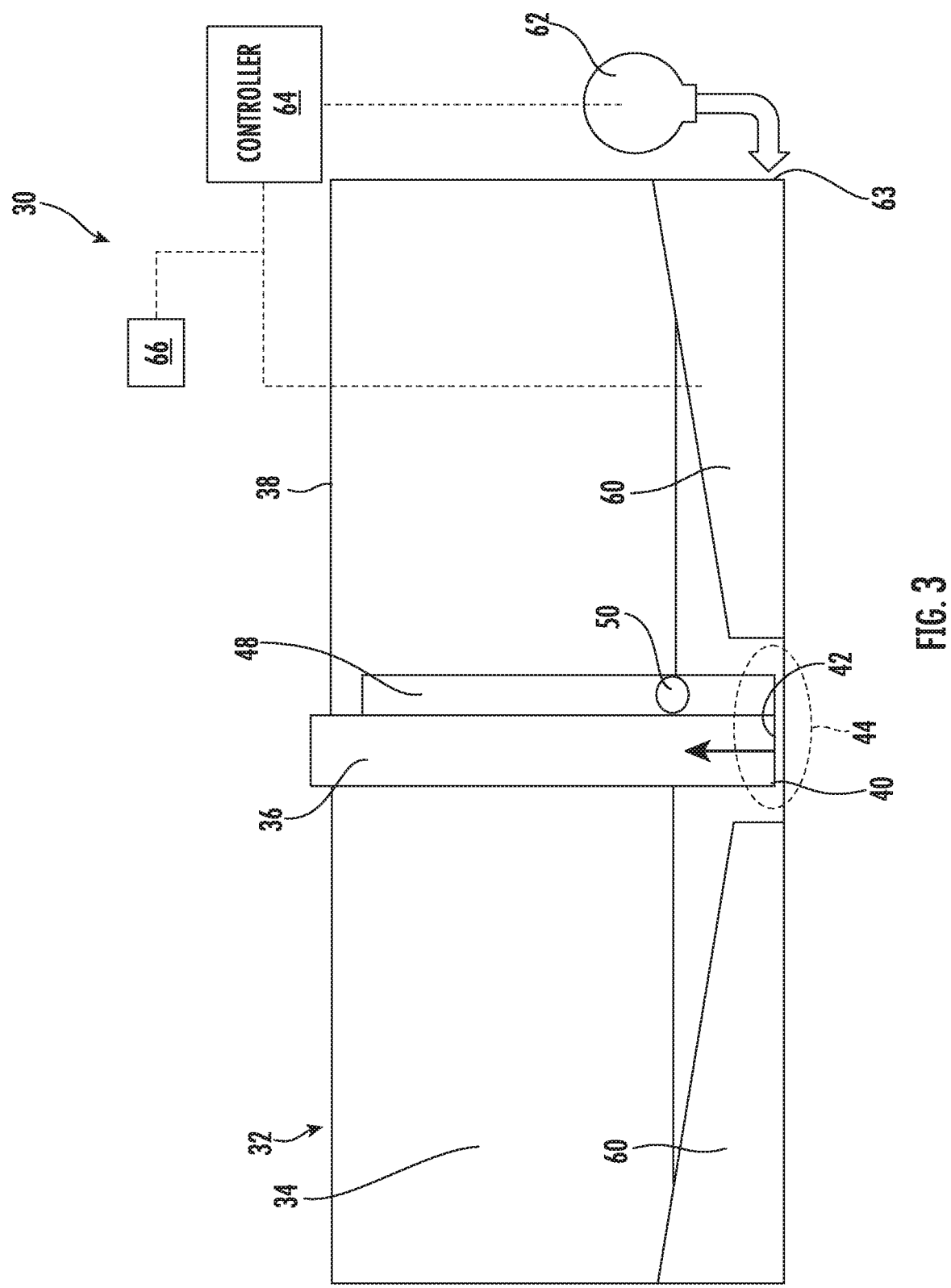
FIG. 3 is a schematic diagram of a fuel tank system having a sump pad in an second configuration according to an embodiment.

In an embodiment, the fuel system 30 additionally includes a probe 48 for determining a level of fuel within the interior 34 of the fuel tank 32. As shown, the probe 48 may be arranged within the fuel tank 32, such as at a location near the fuel line 36 for example, so that the probe 48 measures the level of fuel F at or near the fuel pick-up location 44. In the illustrated, non-limiting embodiment, the probe 48 includes a float 50 which remains buoyant and adjacent an uppermost level of the fuel within the tank 32. The probe 48 additionally includes a switch 52 associated with a reduced or low level of fuel within the tank 32. As fuel F is supplied from the interior 34 of the tank 32 to a downstream component via the fuel line 36, the level of fuel F within the tank 32, and therefore the float 50 gradually lowers. Once the level of fuel F reaches the "low level" associated with the switch 52, as shown in FIG. 3, the float 50 will contact and operate the switch 52 to indicate that the level of fuel F within the tank 34 is at or below the predetermined "low level" threshold. Although a float type probe 48 is illustrated and described herein, it should be understood that any suitable type of sensor for monitoring a level of fuel F within the tank 32 is within the scope of the disclosure. Further, although the probe 48 is described as operating the switch to indicate that the fuel level is at or below a predetermined "low level" threshold, the probe 48 may be adapted to activate the switch at any chosen fuel condition.

Figure 2:
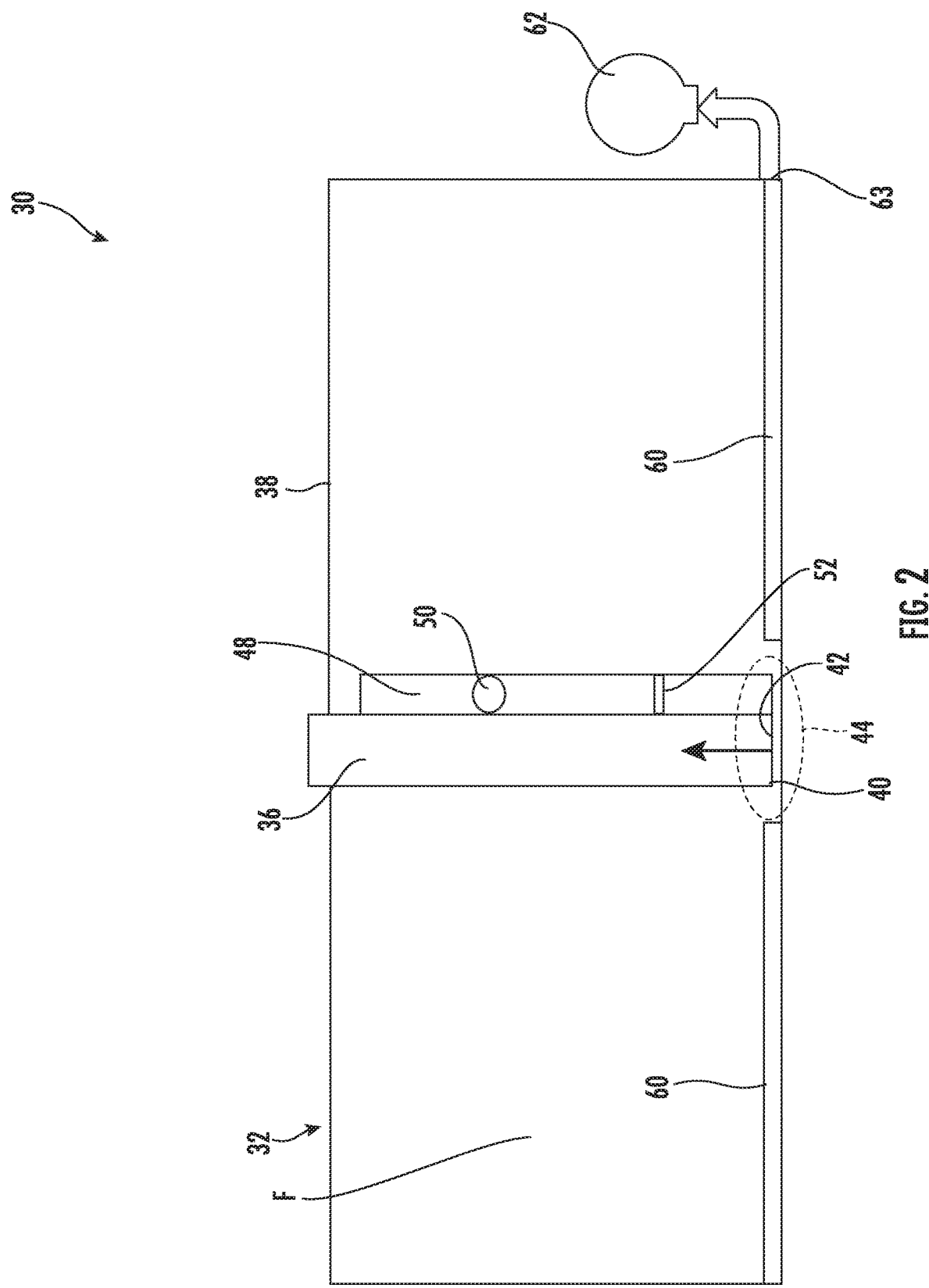
FIG. 2 is a schematic diagram of a fuel tank system having a sump pad in a first configuration according to an embodiment.

As best shown in FIGS. 2 and 3, at least one adjustable sump pad 60 is mounted within the interior 34 of the fuel tank 32. In the illustrated, non-limiting embodiment, two adjustable sump pads 60 are mounted within the interior 34 of the fuel tank 32, adjacent opposing sides of the fuel pick-up location 44. However, it should be understood that embodiments including only a single adjustable sump pad 60 and embodiments including more than two adjustable sump pads 60 are also within the scope of the disclosure. Further, although the sump pads 60 are shown as being mounted to the lower surface 42 of the tank 32, in other embodiments, the sump pads 60 may be affixed to any suitable surface or component within the tank 32. The geometry of each sump pad 60 may depend on the location of the sump pad 60 relative to the fuel tank 32 and the configuration of any adjacent components. Accordingly, in embodiments including multiple sump pads 60, the plurality of sump pads 60 may have similar, or alternatively, different geometric configurations.

Figure 5:
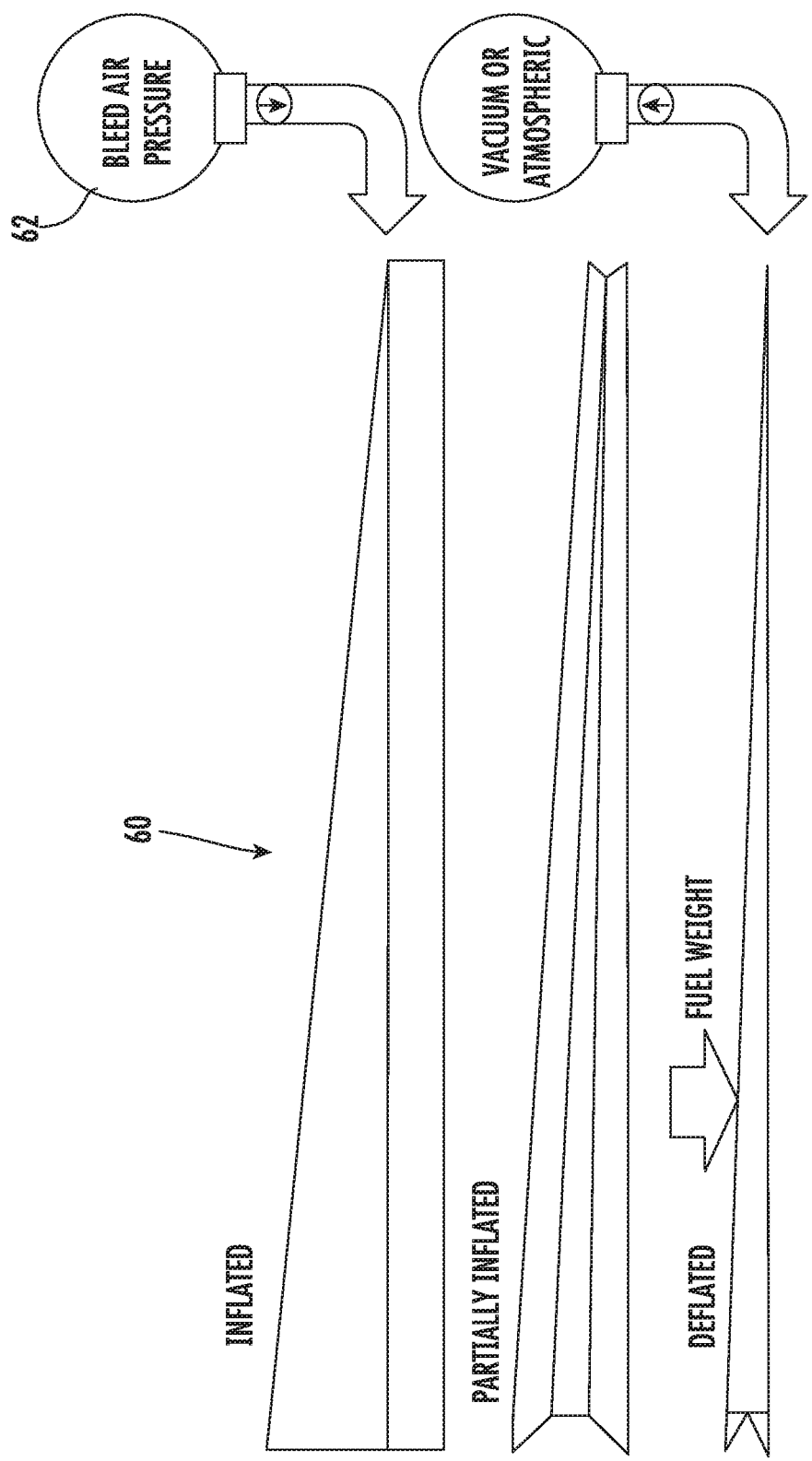
FIG. 5 is a cross-sectional view of a sump pad in various configurations including according to an embodiment.

Each adjustable sump pad 60 is transformable between a first, deflated configuration, as shown in FIG. 2 and a second, inflated configuration, such as shown in FIG. 3. Further, it should be understood that the sump pad 60 may be inflated any amount to achieve a configuration between the deflated configuration and the inflated configuration. A sump pad 60 that is inflated to a configuration between the deflated configuration and the inflated configuration is referred to as "partially inflated" herein. An example of a sump pad 60 in a partially inflated configuration is best shown in FIG. 5.

Each adjustable sump pad 60 is formed from a flexible body and has a generally hollow interior. The sump pads 60 may be removably mounted within the tank 32, or alternatively, may be integrally formed with the material of the tank 32. In an embodiment, the flexible body includes one or more folds, similar to a bellows, to facilitate folding the material of sump pad 60 into the deflated configuration.

As shown, the fuel tank system 30 additionally includes a fluid or pressure source, illustrated at 62, for example located external to the fuel tank 32. The source 62 is arranged in fluid communication with an inlet 63 of at least one adjustable sump pad 60. In embodiments including a plurality of sump pads 60, multiple sump pads 60 may be coupled to the same source 62, or alternatively, to different sources 62. In an embodiment, the source 62 is selectively operable in a first mode to supply a pressurized fluid to a hollow interior of the sump pad 60 to inflate the sump pad 60. In the first mode, pressurized fluid from the source 62 may be provided to transform the sump pad 60 from a partially inflated configuration to a fully inflated configuration, or to transform the sump pad 60 from a deflated configuration to a partially or fully inflated configuration. In an embodiment, the source 62 is an engine or auxiliary power unit of the vehicle and the pressurized fluid is air bled from the source 62. However, in other embodiments, a mechanical, hydraulic, or pneumatic system may be used to transform the sump pad 60 from a first configuration to a second configuration.

In an embodiment, the source 62 may be operable in a second mode to draw a fluid from the hollow interior of the sump pad 60 to deflate the sump pad 60. The fluid within a sump pad 60 is configured to flow toward the source 62, for example due to a pressure difference between the pressure within the fuel tank 32 and a pressure at the source 62. In an embodiment, in the second mode, the source 62 is operable as a vacuum to create a negative pressure to draw not only the fluid, but also moisture from the interior of the sump pad 60. In another embodiment, in the second mode, the source 62 is atmospheric pressure outside of the vehicle. When the vehicle is an aircraft and is in flight, the ambient atmospheric pressure is lower than the pressure within the fuel tank 32, thereby causing the fluid within the sump pad 60 to flow from the interior of the sump pad 60 to the source 62, where it may be expelled overboard. In the second mode, the source 62 is operable to transform the sump pad 60 from an inflated configuration to a partially inflated or deflated configuration, or alternatively, from a partially inflated configuration to a deflated configuration.

With reference again to FIGS. 2 and 3, during operation of the vehicle, fuel F is supplied from the fuel pick-up location 44 to a downstream component, such as an engine, via the fuel pipe 36. As the level of fuel F decreases, the probe 48 monitors the level of fuel F within the tank 32. When the level of fuel F reaches a "low level threshold," as determined by the probe 48, a controller 64 operably coupled to the probe 48 and the source 62 generates a signal to initiate operation of the source 62 in the first mode and supply a fluid to one or more sump pads 60 to at least partially inflate the sump pads 60. In an embodiment, the amount of fluid provided to the sump pads 60 may vary based on the amount of remaining fuel within the tank 32 sensed by the probe 48. In other embodiments, transformation of the one or more sump pads 60 to a fully inflated configuration may be initiated automatically in response to the determination that the fuel F has reached the "low level threshold." In the inflated or partially inflated configuration, the geometry of the sump pad 60 is configured to direct the fuel F remaining within the tank 32 toward the critical fuel pick-up location 44, to maximize accessibility to the fuel F.

At the end of operation of a vehicle, such as upon reaching a destination or at the end of a mission, the source 62 may be operated in the second mode to deflate one or more of the sump pads 60. Alternatively, or in addition, the source 62 may be operated in the second mode as the fuel tank 32 is refilled with fuel F. Drawing the fluid out of the sump pads 60 reduces the volume of the tank 32 occupied by the sump pads 60 to provide more space within the tank 32 which can be filled with fuel F. Alternatively, or in addition, the weight of the fuel F as it is added to the tank 32 will act on the sump pads 60, thereby facilitating the movement of fluid from the sump pads 60 toward the source 62 to be exhausted.

In embodiments where more than one adjustable sump pad 60 is arranged within the interior 34 of the tank 32, all or a portion of the plurality of sump pads 60 may be operated. Accordingly, the plurality of sump pads 60 may be operated in unison or independently of one another. For example, in embodiments where the "low level threshold" is sensed despite a sufficient volume of fuel F within the tank 32 due to the attitude of the vehicle 10, it is possible that only a portion of the sump pads 60 arranged within the tank 32 needs to be operated to direct the fuel F toward the fuel pick-up location 44. In another embodiment, the level of inflation to be provided to various sump pads 60 within the tank 32 may vary based on their position and the attitude of the aircraft. In such embodiments, an attitude sensor, illustrated schematically at 66, may be arranged in communication with the controller 64. The controller 64 may use the attitude detected by the sensor 66 to determine which if any sump pads 60 needs to be inflated to maintain fuel F at the fuel pick-up location 44, and to what degree. Further, upon detecting that the attitude of the vehicle has returned to generally horizontal, the controller 64 may operate the source 62 in the second mode to at least partially deflate the sump pad 60 that was previously inflated.

The fuel system 30 as illustrated and described herein has an increased fuel capacity compared to conventional fuel systems. Further, inclusion of sump pads which are selectively inflatable to direct the fuel within the fuel tank 32 toward a discrete point, such as the fuel pick-up location 44, maximizes the amount of usable fuel within the tank 32. Further, although the fuel system 30 is illustrated and described with respect to an aircraft, it should be understood that the fuel system 30 may be adapted for use in any type of vehicle, including, but not limited to an automotive, tank, and watercraft for example.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel system for providing fuel to a downstream component comprising:
   a fuel tank container having a hollow interior for storing a volume of fuel;
   a fuel line fluidly coupling the hollow interior with the downstream component, a first end of the fuel line being arranged within the hollow interior such that a fuel pick-up location is defined between the first end of the fuel line and an adjacent surface of the fuel tank container;
   an attitude sensor for detecting an attitude of the fuel tank container; and
   a sump pad positioned within the hollow interior, the sump pad being transformable between a deflated configuration and an inflated configuration to direct fuel within the hollow interior toward the fuel pick-up location in response to the attitude detected by the attitude sensor.

2. The fuel system of claim 1, wherein the sump pad is arranged in fluid communication with a source, the source being operable in a first mode and a second mode.

3. The fuel system of claim 2, wherein in the first mode, the source supplies a pressurized fluid to the sump pad to inflate the sump pad.

4. The fuel system of claim 2, wherein the source is an engine.

5. The fuel system of claim 2, wherein the source is an auxiliary power unit.

6. The fuel system of claim 2, wherein in the second mode, the source draws fluid from the sump pad and exhausts the fluid outside the fuel tank system.

7. The fuel system of claim 6, wherein the source is a vacuum.

8. The fuel system of claim 6, wherein the source is atmospheric pressure.

9. The fuel system of claim 2, further comprising a probe for measuring a volume of fuel within the hollow interior of the fuel tank container.

10. The fuel system of claim 9, wherein the source is operable in at least one of the first mode and the second mode in response to the volume of fuel measured by the probe.

11. The fuel system of claim 1, wherein the fuel tank container is a bladder.

12. The fuel system of claim 1, wherein the sump pad is a bladder.

13. The fuel system of claim 1, wherein the fuel system is part of an aircraft.

14. A method of operating a fuel system comprising:
   detecting a volume of fuel within a hollow interior of a fuel tank container;
   performing a comparison of the detected volume with a pre-determined threshold;
   detecting an attitude of the fuel tank container; and
   transforming a configuration of a sump pad disposed within the hollow interior of the fuel tank container in response to the comparison and the detected attitude of the fuel tank container.

15. The method of claim 14, wherein transforming the configuration of the sump pad in response to the comparison includes supplying a pressurized fluid to the sump pad to at least partially inflate the sump pad.

16. The method of claim 15, wherein supplying the pressurized fluid to the sump pad to at least partially inflate the sump pad occurs when the detected volume of fuel equal to or less than the predetermined threshold.

17. The method of claim 14, wherein transforming the configuration of the sump pad in response to the comparison includes drawing a fluid from the sump pad to at least partially deflate the sump pad.

18. The method of claim 17, wherein drawing the fluid from the sump pad to at least partially deflate the sump pad occurs when the detected volume of fuel is greater than the predetermined threshold.

19. The method of claim 14, wherein detecting a volume of fuel within a hollow interior of a fuel tank container is performed by a probe disposed within the hollow interior of the fuel tank container.

* * * * *